United States Patent Office 2,869,807
Patented Jan. 20, 1959

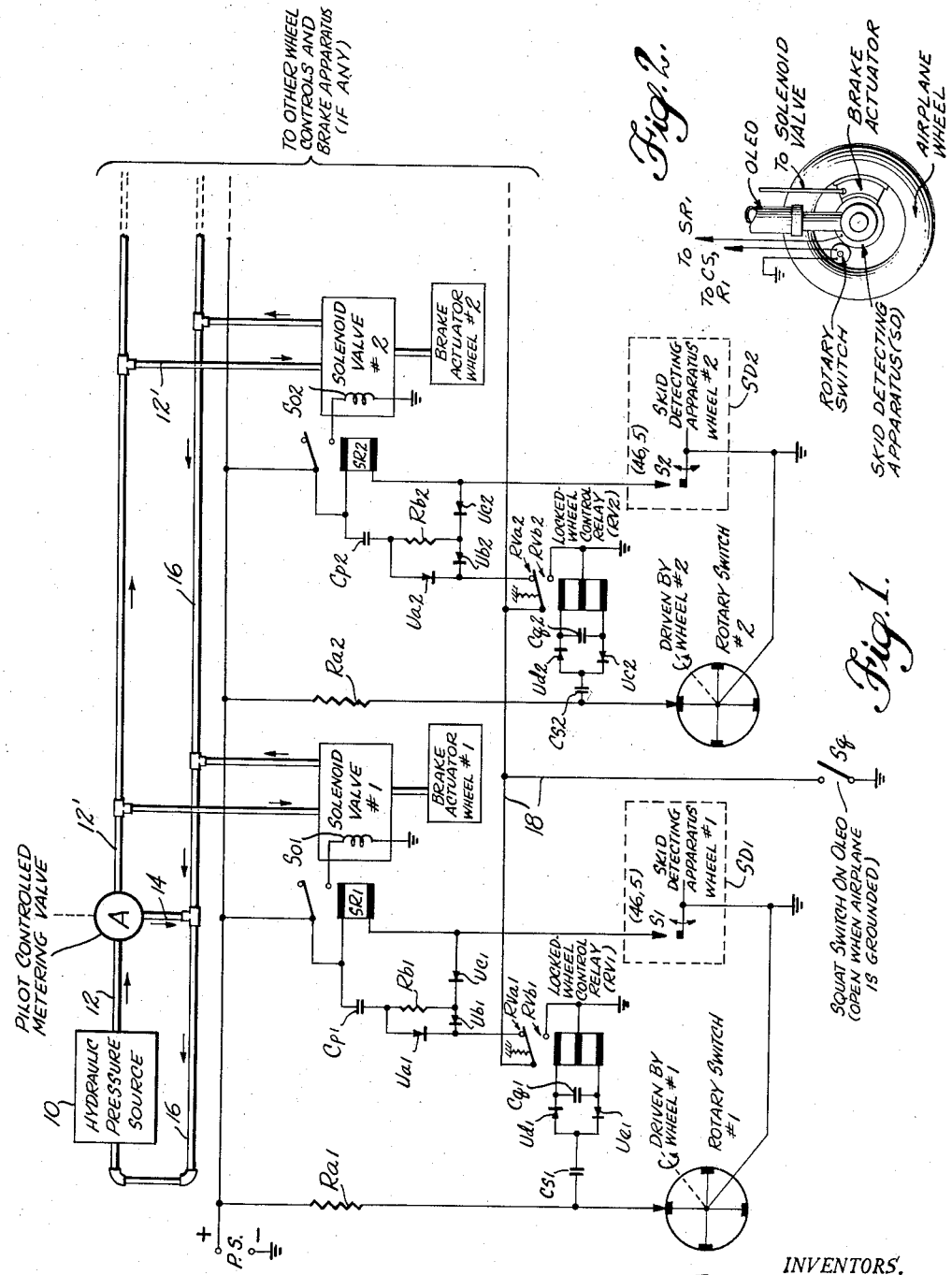

2,869,807

ANTI-SKID BRAKE CONTROL SYSTEM WITH LOCKED-WHEEL PREVENTION APPARATUS

Francis G. Hyland, Bellevue, and Henry W. Kassel, Seattle, Wash., assignors to Boeing Airplane Company, Seattle, Wash., a corporation of Delaware Application May 31, 1955, Serial No. 512,096

9 Claims. (Cl. 244—111)

This invention relates to improvements in automatic brake control systems for airplanes and more particularly concerns an improved system for preventing skidding of the landing wheels and consequent loss of braking efficiency as well as the hazards and tire wear which accompany skidding during the landing run. The invention is herein illustratively described by reference to the presently preferred form thereof as applied to a brake system for two independently braked wheels; however, it will be recognized that the novel features comprising the invention are capable of embodiment in various different forms suitable for the illustrated application and others.

The improved system as herein disclosed may utilize selected features and combinations covered variously in the following United States Patents: 2,631,696, Brake Control Mechanism, March 17, 1953, Gordon W. Yarber; 2,636,700, Airplane Landing Wheel Brake Control Apparatus, April 28, 1953, Yarber et al.; and 2,663,521, Airplane Landing Wheel Brake Control Apparatus, December 22, 1953, Gordon W. Yarber.

A general object herein is to provide a brake control system of the type described which affords the basically essential or desirable control features in a novel arrangement characterized by its relative simplicity, reliability and by its lightness of weight, compactness and low cost of installation and maintenance.

For certain applications, with which the present invention is concerned, the essential or desirable control conditions to be satisfied by the automatic brake control system are as follows, keeping in mind that the underlying purpose of the system is to avoid wheel slipping and skidding without otherwise interfering with the normal operation of the brakes by the airplane pilot. First of all, it is desirable to prevent brake application at the instant of initial touch-down during landing and also at the instant of subsequent touch-downs after bounce landings or after one wheel has lifted from the runway as in a crosswind. Secondly, during the landing run it is desirable to detect incipient skidding of any wheel and release the brake of that wheel for a time just sufficient to permit its recovery of substantially full running speed before resumption of braking is permitted. Thirdly, it is important to detect a full skid or substantially locked-wheel condition and to release the brake of that wheel for an extra long time period just sufficient to permit recovery of substantially full running speed, regardless of whether the locked-wheel condition develops as a result of an icy runway, tilting of the airplane and attendant lifting of the wheel from the runway surface, or for any other reason. Fourth, it is essential that the skid-preventing apparatus permit normal braking of all wheels during taxiing and parking of the airplane.

A specific object of the present invention is to provide a simplified antiskid brake control system satisfying the foregoing operating conditions in a manner suitable for high-speed aircraft of modern design.

With the foregoing and other objects in view the novel features and advantages of the invention, including certain details of the illustrative embodiment thereof will become more fully evident from the following description by reference to the accompanying drawing.

Fig. 1 is a schematic diagram of the presently preferred form of the system as applied to an airplane having two separately braked landing wheels.

Fig. 2 is a simplified diagram of one of the landing wheels and related components functioning in the present system.

In the example the brake actuators for the airplane landing wheels are operated hydraulically. Operating fluid under pressure is delivered from the hydraulic pressure source 10 through a pressure line 12 to one side of the pilot-controlled metering valve A. The metering valve A provides a means controllable at will for reducing the pressure in the brake line 12′ to any desired brake operating pressure. The brake line 12′ branches to the individual brake actuators as shown, and the metering valve is provided with the usual connection 14 to the return line 16 leading to the negative pressure side of the hydraulic pressure source 10. The degree of braking effort exerted by the individual brake actuators is directly related to the metered pressure in the brake line 12′.

In the drawing certain components and parts associated with the control apparatus are duplicated for the two wheel brakes and those which correspond are identified by similar reference members with the subscript notations 1 and 2 employed to indicate their associations with wheel No. 1 and wheel No. 2, respectively.

As explained in the above-cited patents it is not always feasible to rely solely upon the skill and judgment of the pilot operating the metering valve A to operate the brakes in an optimum manner avoiding the hazards and tire wear accompanying wheel skidding and achieving maximum braking efficiency by braking the wheels substantially to the point of incipient skidding. As explained in said patents it is desirable, therefore, that a means be provided which will automatically release the brake or reduce the braking pressure applied to any landing wheel which starts to slip or skid and to permit such wheel substantially to recover its normal running speed before the metered brake pressure is again applied. Thus, the pilot retains uninterrupted control over braking unless and until conditions arise producing skidding of any wheel, whereupon the automatic apparatus relieves the skid. Certain other contingencies are also met by the disclosed apparatus, as will hereinafter appear.

In the example a solenoid valve is interposed in each of the brake line branches 12′ leading to the respective brake actuators. Solenoid valve No. 1 is actuated by energization of solenoid $So1$ to divert the pressure-fluid from the brake actuator to the return line 16 and thereby release the brake for one landing wheel. Solenoid valve No. 2 has a similar actuating solenoid $So2$ energizable to release the brake for the second wheel.

There are three different ways in which either solenoid may be energized to release the associated wheel brake. As the description proceeds these different operations will be recognized as originating respectively in the skid-detecting apparatus SD for the particular wheel, or in the squat switch $Sq$, or alternatively in the rotary wheel-driven switch and its associated components for each individual landing wheel. In each instance solenoid energization is directly the result of energization of the associated skid control relay SR. Energization of such relay produces closure of its contacts to connect the solenoid windings between the positive and negative sides of the power supply PS. The relays SR are of the slow release type for a purpose to be described.

One terminal of each relay SR1 and SR2 is connected to the positive side of the power supply. Its opposite terminal is grounded or connected to the negative side through either of different selected paths, depending upon the control function causing energization of the relay. One such grounding path comprises the normally open contacts S of the skid-detecting apparatus SD associated with the particular wheel. The skid detecting apparatus SD is preferably similar to that disclosed in U. S. Patent No. 2,631,696 cited above. Contacts S correspond to contact elements 46 and 5 in such patent. The recovery sensing contacts of the patent are not used in the present case. Closure of contacts S1, for instance, is caused automatically by a material deceleration of the landing wheel below normal or full running speed at any instant. Whenever an incipient skidding condition develops the contacts S automatically close during and as a result of wheel deceleration to energize the associated skid-control relay SR and cause operation of the solenoid valve to release the wheel brake. Because of the nature of the particular skid-detecting apparatus employed in the example, the contacts S1, for example, reopen as soon as wheel deceleration ceases or has decreased to a predetermined reduced value, thus opening the energizing circuit for relay SR1. However, the relay is of the slow-release type (i. e. provided with a dashpot, copper slug shorted turn, or other expedient) and the contacts of this relay do not immediately reopen upon removal of the energizing circuit voltage but remain closed for a time sufficient to allow the wheel to recover substantially full running speed before the brake can be applied again by reopening of the solenoid valve. The solenoid valve for each wheel may be opened and closed many times by repeated actuation of the skid-detecting contacts S during a landing run so that the average braking force applied to the wheel is substantially optimum (i. e. maintaining the wheel on the verge of skidding) for achieving maximum rate of deceleration. The relays SR have an alternate grounding path through the series-connected rectifiers Uc and Ub, the normally (in flight) closed upper set of contacts RVa of locked-wheel control relay RV, conductor 18 and the normally (in flight) closed squat switch contacts. The squat switch Sq is operated by the landing gear oleo (Fig. 2) to remain closed in flight and to open when a material portion of the airplane's weight has been transferred from the wheels to the landing gear on landing of the airplane. Thus, as the airplane approaches the runway the pilot is unable to operate the wheel brakes through a metering valve A before touch-down, because the skid control relays SR1 and SR2 are both energized through the squat switch.

It will be evident that a materially longer time period is required for the attaining of full running speed of the wheels when they are not rotating fast to begin with, such as upon initial touch-down when squat switch Sq opens, than when they are already near full running speed, such as in the case of an interrupted incipient skid condition, when the skid detecting contacts S1 or S2 open. With this in view, during the landing approach, while squat switch Sq is closed, not only are relays SR1 and SR2 energized by the described grounding circuit, but the associated by-pass condensers Cp1 and Cp2, respectively, are fully charged. These condensers are charged through the rectifiers Ua. When the squat switch Sq opens, therefore, the solenoids SR do not release immediately nor at the end of their inherent relatively short release delay time, as in the case of deenergization of relay SR to terminate an incipient skid; instead a considerably longer delay time is afforded by the discharge of the condensers Cp through the respective relay coils and resistors Rb connected in series therewith. Condensers Cp and resistors Rb are chosen so that the additional relay release delay time caused by condenser discharge allows ample time on the average for the wheels to accelerate from practically zero speed to substantially full running speed following interruption of the grounding circuit at the squat switch.

Each relay RV has a normally closed upper contact RVa and a normally open lower contact RBb. These contacts have a common switch arm. Such contacts arms for the two relays are interconnected by the conductor 18. The third grounding circuit for the relays SR, alternatively available in preventing or removing a skid condition (i. e. locked-wheel condition in this instance) includes the upper contact RVa of the relay associated with that wheel and the closed contact RVb of the other relay RV. Either relay RV1 or RV2 is energizable to close its lower contacts RBb by wheel-driven means whenever the wheel speed exceeds a predetermined value usually slightly above normal taxiing speeds but greatly below initial landing speed.

Energization of the relays RV1 and RV2 by the wheel-driven means involves circuit connections including a grounded center tap for each such relay coil, as shown. The coils are by-passed by filter condensers Cq1 and Cq2, respectively. The opposite ends of such coils are connected to one side of charging condenser Cs through rectifiers Ud and Ue, respectively, which rectifiers are arranged with relatively opposite polarities in the connecting leads. The opposite side of charging condenser Cs in each wheel control circuit is connected to the junction between resistance Ra and to the stationary wiper of the multiple-segment wheel-driven rotary switch depicted in the diagram. The opposite side of resistance Ra is connected to the positive side of the power supply PS and the conductive segments of the rotary switch rotor are connected to the grounded negative side of the power supply. When the rotary switch wiper engages a conductive segment as in the figure, the storage condenser Cs discharges through the rotary switch contact wiper and through rectifier Ue and the lower half of the winding of relay RV. On the other hand, when the rotary switch wiper contacts an insulating segment of the rotary switch, condenser Cs charges through resistance Ra and the upper half of the relay coil RV, through rectifier Ud. In both cases the flow of current through the halves of the relay coil is in the same sense; hence as long as the rotary switch and the landing wheel driving it rotate above a predetermined minimum speed, the relay RV will be energized to maintain closure of contacts RVb.

Assuming both landing wheels are rotating at speeds above said minimum speed, the conductor 18 will be grounded through all of the engaged lower sets of contacts RVb of the relays RV. However, under these conditions should the braking action degenerate on one wheel and a locked-wheel condition result, the great reduction of wheel speed will produce a corresponding or proportionate reduction in current flow through the associated locked-wheel control relay RV and produce disengagement of contacts RVb and consequent engagement of contacts RVa of that relay. This immediately forms an energizing circuit for the associated skid control relay SR, such circuit including the engaged contacts RVa of the associated relay RV and the still-engaged contacts RVb of the other wheel (assuming, of course, the other wheel is not also locked). Such action could occur, for example, when the airplane tilts to one side on a runway, as in a crosswind, and one wheel is lifted off the ground or its contact pressure on the ground is substantially reduced so that the wheel develops a skid. It could also occur in case one wheel passes over a stretch of icy runway whereas the other wheel continues to engage a less slippery surface. In any case when a locked-wheel condition materializes on only one wheel to energize the SR relay for that wheel's control circuit to release the wheel brake, the associated condenser Cp charges quickly through the rectifier Ua. When the wheel starts to rotate again relay RV becomes reenergized to break the energizing connection for the associated relay SR. As in the case of opening of squat switch Sq on initial touch-down however, relay SR does not immediately release when relay RV is reenergized, because of the prolonged discharge of condenser Cp through the coil of SR. Hence the wheel is allowed time to come up to substantially full running speed before the brakes can be reapplied to that wheel.

Filter condensers Cq prevent current pulsations in the respective locked-wheel control relays RV from causing the relays to follow the pulse repetition rate at low wheel speeds. The presence of these condensers shunted across the relay coils requires a slightly faster wheel rotation speed to actuate the relays, than the speed necessary to maintain such relays in their actuated condition. This factor produces a further delay in the release of the associated relay SR following wheel acceleration pursuant to relief of a locked-wheel condition.

As the airplane slows down to taxiing speed during landing, the circuit design permits the locked wheel control relay to become deenergized, and since the squat switch Sq is then open, the pilot has full control over the application of wheel brakes for taxiing and parking purposes. As the wheels slow down to the point where the locked wheel control relays RV tend to drop out, one usually deenergizes and drops out before the other due to unavoidable slight differences in components. Should that occur, the wheel associated with the locked-wheel control relay which first deenergizes will momentarily be without brakes because an energizing circuit for its skid-control relay SR is formed through the still-engaged contacts RVb of the locked-wheel control relay RV of the other wheel at that instant. However, the resulting differential braking is so short-lived as to be unnoticeable. Its prolongation due to any residual charge on one of the condensers Cp is avoided by the presence of rectifiers Ub which block discharge of such condenser associated with one wheel through the relay SR associated with the other wheel, when finally the upper contacts RVa of both wheels are engaged.

The invention has been described herein by reference to a two-wheel system. It will be recognized that the same principles apply to systems having greater numbers of wheels. The circuit diagram shows the manner of extending the hydraulic and electrical connections if desired for that purpose.

We claim as our invention:

1. Means for detecting increase of vehicle wheel speed above a predetermined value, comprising in combination, electrical switching means adapted to be driven by a vehicle wheel and having contacts opened and closed alternately at a frequency proportional to wheel speed, an electric relay having relay-actuating winding means including two inductive elements, and circuit means for energizing said winding means inductive elements to operate said relay upon an increase of wheel speed at least to said predetermined value, said circuit means including a connection between one of said switch contacts and one side of each of said inductive elements, condenser means having terminals respectively connected to the opposite sides of said inductive elements, a source of direct current, means connecting said source to the other switch contact, conductive connections between said latter connecting means and the respectively opposite sides of said inductive elements, unidirectionally conductive devices respectively interposed in said latter conductive connections with relatively opposite polarities, and condenser means interposed between said unidirectionally conductive devices and said means interconnecting said source and said other switch contact, said winding means inductive elements being arranged in said relay to operate such relay by the combined action of currents flowing respectively into one such inductive element through the first-mentioned side thereof and out of the other such inductive element through the first-mentioned side thereof, whereby during closure of said contacts said first condenser means delivers current to one such inductive element while said source delivers current to the other such inductive element, and vice-versa during opening of said contacts.

2. A vehicle brake control system comprising individual brake actuators for each of a plurality of vehicle carriage wheels, operator-controlled means connected to said brake actuators for operating said brake actuators at will; individual skid-preventing means for each such wheel comprising, in combination with each such brake actuator, brake-release means operatively connected to said brake actuator and operable to interrupt operator-controlled operation of the brake actuator, wheel-deceleration sensitive means operatively connected to said brake release means and automatically operating said brake release means in response to material deceleration of the wheel below normal running speed thereof, thereby to interrupt incipient wheel skidding, and locked-wheel preventing means for each such wheel including wheel-speed-actuated control means for operating said brake release means of the wheel automatically in response to substantial stoppage of wheel rotation only during continued rotation of at least one other wheel, said control means for each wheel including a control member, and means, controlled by wheel speed, actuatingly connected to said control member for actuating the same to a first position in response to substantial stoppage of associated wheel rotation and to a second position in response to associated wheel rotation above a predetermined speed, said control member being connected to the like control members of the other wheel control means, first means for each wheel operatively connected to the associated wheel brake release means and engageable by the control member in its first position to partially complete an energizing connection to such brake release means, and second means for each wheel engageable by said control member in its second position and having means thereby adapted to complete an energizing connection to the brake release means of any other wheel, said energizing connection so completed including the control member and associated first means engaged thereby of such other wheel, whereby none of the brake release means are operated when all of said wheels are substantially stopped.

3. An airplane brake control system comprising individual brake actuators for each of a plurality of airplane landing wheels, pilot-controlled means connected to said brake actuators for operating said brake actuators at will; individual skid-preventing means for each such wheel comprising, in combination with each such brake actuator, brake-release means operatively connected to said brake actuator and operable to interrupt pilot-controlled operation of the brake actuator, wheel deceleration sensitive means operatively connected to said brake release means and automatically operating said brake release means in response to material deceleration of the wheel below normal running speed thereof, thereby to interrupt incipient wheel skidding, and locked-wheel preventing means for each such wheel including wheel-speed-actuated control means for operating said brake release means of the wheel automatically in response to substantial stoppage of wheel rotation only during continued rotation of at least one other wheel, said control means for each wheel including a control member, and means, controlled by wheel speed, actuatingly connected to said control member for actuating the same to a first position in response to reduction of associated wheel speed to a predetermined value and to a second position in response to associated wheel rotation above a predetermined speed, said control member being connected to the like control members of the other wheel control means, first means for each wheel operatively connected to the associated wheel brake release means and engageable by the control member in its first position to partially complete an energizing connection to such brake release means, and second means for each wheel engageable by said control member in its second position and having means thereby adapted to complete an energizing connection to the brake release means of any other wheel, said energizing connection so completed including the control member and associated first means engaged thereby of such other wheel, whereby none of the brake release means are operated when the speed of all of said wheels is below said first-mentioned predetermined value.

4. The airplane brake control system defined in claim 3, and landing gear actuated squat switch means having one position with the airplane off the ground and an opposite position with the airplane grounded, said squat switch being connected to the control members of all wheel control means and being adapted in the first position of said squat switch to operate the brake release means of all wheels through said control members and associated first means engaged thereby.

5. The airplane brake control system defined in claim 4, wherein the brake release means are adapted for operation by electrical energization thereof, the control member actuating means comprises an electrical relay, the control member comprises a switch member in such relay movable between first and second switching positions by energization and deenergization of such relay, the first means comprises a first switch-engageable contact in such relay connected to the brake release means, the second means comprises a second switch-engageable contact in such relay and an energy source connected to such second contact for producing energization and operation of any other wheel brake release means through the associated switch member and first contact engaged thereby.

6. The airplane brake control system defined in claim 3, wherein the brake release means are adapted for operation by electrical energization thereof, the control member actuating means comprises an electrical relay, the control member comprises a switch member in such relay movable between first and second switching positions by energization and deenergization of such relay, the first means comprises a first switch-engageable contact in such relay connected to the brake release means, the second means comprises a second switch-engageable contact in such relay and an energy source connected to such second contact for producing energization and operation of any other wheel brake release means through the associated switch member and first contact engaged thereby.

7. Means for detecting increase of electrical switching frequency above a predetermined value, comprising in combination with a source of direct voltage a switch and a resistance connected in series across said source, said switch being adapted for recurrent opening and closing operation at a variable frequency, an electric relay having relay-actuating winding means including two inductive elements, and circuit means for energizing said winding means inductive elements to operate said relay upon an increase of switching frequency at least to said predetermined value, said circuit means including a connection between one side of said source and one side of each of said inductive elements, condenser means having terminals respectively connected to the opposite sides of said inductive elements, a charging condenser having one terminal connected to the junction between said switch and said resistance and an opposite terminal connected to both terminals of said first-mentioned condenser means, and unidirectionally conductive devices respectively interposed in the connections between said first-mentioned condenser means, terminals and said charging condenser, with relatively opposite polarities, said winding means inductive elements being arranged in said relay to operate such relay both during charging and discharging of said charging condenser during opening and closing operations respectively of said switch.

8. In an airplane brake control system having individual brake actuators for each of a plurality of airplane landing wheels, pilot-controlled means connected to said actuators for actuating the same at will, individual brake deactuating means connected to the respective actuators and operable to effect release of the brakes of the respective wheels, and individual wheel skid detecting means operatively connected to the respective brake deactivating means for operating the same to release the brake of any such wheel automatically in response to skidding of such wheel, apparatus for preventing a locked wheel condition comprising first means individually associated with each wheel and being arranged to be connected operatively for brake deactuation purposes to the brake deactuating means of the other wheels, said first means for each such wheel being operable in response to rotation of its individually associated wheel to effect release of the brake of any other wheel to the deactuating means of which it is then connected, and second means individually associated with each wheel and being connected to the first means of the remaining wheels, said second means being arranged to connect the first means of the remaining wheels to the brake deactuating means of the second means' individually associated wheel in response to substantial stoppage of rotation of the latter wheel, thereby to release the brake of that wheel.

9. An airplane brake control system comprising individual brake actuators for each of a plurality of airplane landing wheels, pilot-controlled means connected to said brake actuators for operating said brake actuators at will; individual skid-preventing means for each such wheel comprising, in combination with each such brake actuator, brake-release means operatively connected to said brake actuator and operable to interrupt pilot-controlled operation of the brake actuator, wheel deceleration sensitive means operatively connected to said brake release means and automatically operating said brake release means in response to material deceleration of the wheel below normal running speed thereof, thereby to interrupt incipient wheel skidding, and locked-wheel preventing means for each such wheel including wheel-speed-actuated control means for operation of said brake release means of the wheel automatically in response to substantial stoppage of wheel rotation only during continued rotation of at least one other wheel, said control means for each wheel including a control member, and means, controlled by wheel speed, actuatingly connected to said control member for actuating the same to a first position in response to reduction of associated wheel speed to a predetermined value and to a second position in response to associated wheel rotation above a predetermined speed, said control member being connected to the like control members of the other wheel control means, first means for each wheel operatively connected to the associated wheel brake release means and engageable by the control member in its first position to partially complete an energizing connection to such brake release means, and second means for each wheel engageable by said control member in its second position and having means thereby adapted to complete an energizing connection to the brake release means of any other wheel, said energizing connection so completed including the control member and associated first means engaged thereby of such other wheel, whereby none of the brake release means are operated when the speed of all of said wheels is below said first-mentioned predetermined value, said brake release means being adapted for operation by electrical energization thereof, the control member actuating means comprising an electrical relay, the control member comprising a switch member in such relay movable between first and second switching positions by energization and deenergization of such relay, the first means comprising a switch-engageable contact in such relay connected to the brake release means, the second means comprising a second switch-engageable contact in such relay and an energy source connected to such second contact for producing energization and operation of any other wheel brake release means through the associated switch member and first contact engaged thereby, said individual wheel control means comprising wheel-speed-operated means connected to the associated relay and providing energizing current to such relay, said wheel-speed-operated means including a source of voltage, a rotary switch means including contacts connected across said source and opened and closed alternately by wheel rotation, a resistance in series with said contacts, and circuit means connecting the relay coil between one side of said source and the junction between said resistance and said rotary switch means, said latter circuit means including a connection from an intermediate point on the relay coil to one side of said source, a storage condenser having one side connected to said junction, two unidirectional conductive devices having unlike electrodes connected to the opposite side of said condenser and the remaining two electrodes connected respectively to the opposite ends of the relay coil, and a filter condenser connected across said coil, whereby opening and closing of said rotary switch contacts produces successive charge and discharge of said storage condenser and flow of current in the same direction alternately through the sections of said coil on either side of said intermediate point thereon.

References Cited in the file of this patent

UNITED STATES PATENTS

| | | |
|---|---|---|
| 1,555,893 | Thompson | Oct. 6, 1925 |
| 1,672,049 | Almquist | June 5, 1928 |
| 2,343,423 | Reagan | Mar. 7, 1944 |
| 2,631,696 | Yarber | Mar. 17, 1953 |
| 2,635,197 | Routledge | Apr. 14, 1953 |
| 2,663,521 | Yarber | Dec. 22, 1953 |
| 2,683,244 | Salaun et al. | July 16, 1954 |